United States Patent
Williams et al.

(10) Patent No.: US 6,291,598 B1
(45) Date of Patent: Sep. 18, 2001

(54) PROCESS FOR THE PRODUCTION OF A POLYMERIZED MATERIAL AND THE PRODUCT PRODUCED THEREBY

(76) Inventors: Michael C. Williams, 4736 - 151 Street, Edmonton, Alberta (CA), T6H 5N8; Nai-Hong Li, 3608 - 117 B Street, Edmonton, Alberta (CA), T6J 1W2; Yatin Sankholkar, B-24 T, Off Veer Savarkarmarg, Prabhadevi, Bombay 400 025 (IN)

( * ) Notice: Subject to any disclaimer, the term of this patent is extended or adjusted under 35 U.S.C. 154(b) by 0 days.

(21) Appl. No.: 09/230,717

(22) PCT Filed: Jul. 29, 1997

(86) PCT No.: PCT/CA97/00531

§ 371 Date: Oct. 18, 1999

§ 102(e) Date: Oct. 18, 1999

(87) PCT Pub. No.: WO98/04614

PCT Pub. Date: Feb. 5, 1998

Related U.S. Application Data
(60) Provisional application No. 60/022,417, filed on Jul. 30, 1996.

(51) Int. Cl.$^7$ .............................. C08G 69/18; C08L 77/00
(52) U.S. Cl. .................. 525/467; 525/433; 528/200; 528/203; 528/319; 524/611; 524/876; 524/879
(58) Field of Search ..................................... 525/467, 433; 528/200, 203, 319; 524/611, 876, 879

(56) References Cited

U.S. PATENT DOCUMENTS

| | | |
|---|---|---|
| 3,225,114 | 12/1965 | Chapman . |
| 4,431,795 | 2/1984 | Krimm et al. . |
| 4,599,398 | * 7/1986 | Hodek . |
| 4,760,117 | 7/1988 | Evans . |
| 5,187,228 | 2/1993 | Perron et al. . |

FOREIGN PATENT DOCUMENTS 0249809A  12/1987  (EP) .

OTHER PUBLICATIONS

Keul H. et. al., "Cyclic Oligomers Obtained By Polymerization of 2,2–Dimethyltrimethylene Carbonate in the Presence of ∈–Caprolactam", *European Polymer Journal*, vol. 28(6), 611–614 (1992).
Krimm H. et.al., "Copolymers from aliphatic polycarbonates and lactams" *Chemical Abstracts*, vol. 97, 56407h (1982).
Cortazar, M. et.al., "A Calorimetric Study of the Interchange Reactions in Bisphenol A Polycarbomate/Nylon–6 Blends", *British Polymer Journal*, vol. 21, 395–397 (1989).
Gattiglia E. et.al., "Blends of Polyamide 6 with Bisphenol–A Polycarbonate.I.Thermal Properties and Compatibility Aspects", *Journal of Applied Polymer Science*, vol. 38, 1807–1818 (1989).
Gattiglia E. et.al., "Blends of Polyamide 6 and Bisphenol–A Polycarbonate. Effects of Interchange Reactions on Morphology and Mechanical Properties", *Journal of Applied Polymer Science*, vol. 46, 1887–1897 (1992).
Heggs, R.P. et.al.,"Viscosity Modifier for Improved PC/nylon Blends", *Plastics Engineering*, Jun. 1988, pp. 29–32.
Gattiglia, E. et.al., "Effects of mixing time and blend composition on properties and morphologies of polyamide 6/polycarbonate blends", *Polymer Bulletin*, vol. 21, 47–52 (1989).
Furstner, A. (Editor), Active Metals, (1996), 299–338.
Guggenheim T.L. et.al., "Synthesis and Polymerization of Cyclic Oligomeric Arylates Based on Bisphenol A and Isophthaloyl Dichloride",*Polymer Preprints*, vol. 30(2), 579–580 (1989).
Evans, T.L. et.al., "Use of Cyclic Carbomate Oligomers in the Synthesis of Bisphenol–A Polycarbonate/Polydimethylsiloxane Copolymers", Polymer Preprints vol. 31(1), 18–19(1990).
Brunelle, D.J. et.al.,"Preparation of Functionalized Polycarbonates Via Ring–Opening Polymerization of Diverse Mixed Oligomeric Cyclic Carbonates", *Polymer Preprints*, vol. 31(1), 14–15 (1990).
Brunelle, D.J. et.al., "Preparation of Crystalline and Solvent Resistant Polycarbonates Via Ring–Opening Polymerization of Cyclic Oligomers", *Macromol.Symp.*, vol. 77, 117–124 (1994).
Article entitled GE, Ford develop cyclic oligomer, May 4, 1992 (1 Page).
Carlson E. et.al., "Nylon Under the Hood: A history of innovation", *Automotive Engineering*, 84–89 (Dec. 1996).
Barentsen W.M., Heikens D., *Polymer*, 14, 579, 1973.
Brunelle D.J., Evans T.L., Shannon T.G., Boden E.P.,Stewart K.R.,Fontana L.P., Bonauto D.K., *Polymer Preprints*,30(2), 569,1989.
Coutinho F.M.B., Sobrinho A.A.B., *European Polymer Journal*, 27(1), 105, 1991.
Evans T.L., Berman C.B., Carpenter J.C., Choi D.Y., Williams D.A., *Polymer Preprints*, 30(2), 573,1989.

(List continued on next page.)

*Primary Examiner*—David J. Buttner
(74) *Attorney, Agent, or Firm*—Rodman & Rodman

(57) ABSTRACT

A polymerized material produced by the polymerization of an organic amide monomer in the presence of an organic carbonate and a process for the preparation thereof. The process comprises the steps of: heating an amount of the organic anide monomer to a temperature above its melting point; first mixing an amount of an anionic initiator with at least a portion of the amount of heated organic amide mnonomer to produce an amount of activated monomer, wherein the anionic initiator is not comprised of an alkali metal; second mixing an amount of the organic carbonate with at least a portion of the amount of heated organic amide monomer to produce an amount of dissolved organic carbonate; and polymerizing the amounts of heated organic amide monomer and activated monomer in the presence of the amount of dissolved organic carbonate to produce the polymerized material.

35 Claims, No Drawings

OTHER PUBLICATIONS

Falk J.C., Schlott R.J., Hoeg D.F., *Journal of Macromolecular Science*, Chemistry, 7(8), 1647, 1973.

Fischer J.P., Chemical Abstracts,82, 5822OF, 1975.

Gattiglia E., Turturro A.,Pedemonte E., Dondero G., *Journal of Applied Polymer Science*, 41, 1411, 1990.

Heller J. *Polymer Engineering and Science*, 11(1), 6, 1971.

Heller J., Miller D.B., *Journal of Polymer Science*, Part B, 7(2), 141, 1969.

Ide F., Hasegawa A., *Journal of Applied Polymer Science*, 18, 963, 1974.

Immergut E.H., Mark H., *Makromol.Chem.*, 18/19, 322 (1956).

Jancar J., Dibenedetto A.T., Goldberg A.J., *Journal of Materials Science:Materials in Medicine*, 4, 562, 1993.

Johnston N.W., *Polymer Preprints, American Chemical Soceity, Division of Polymer Chemistry*, 14(1), 46, 1973.

Limtasiri T.,Grossman S.J.,Huang J.C., *Polymer Engineering and Science*, 28(18), 1145, 1988.

Locke C.E., Paul D.R., *Journal of Applied Polymer Science*, 17, 2597, 1973.

Mougin N., Rempp P., Gnanou Y., *Macromolecules*, 25, 6739, 1982.

Reimschuessel H.K., *Journal of Polymer Science, Macromolecules Review*, 12, 90–125, 1977.

Riess G., Kohler J., Tournut C., Banderet A., *Makromol. Chem.*, 101, 58, 1967.

Seo S.W., Ha W.S., *Journal of Applied Polymer Science*, 48, 833, 1993.

Stehlicek J., Sebenda J., *European Polymer Journal*, 18, 535, 1982.

Stehlicek J.,Tuzar Z.,Kazmierski K.,Sebenda J., Chojnowski J., *European Polymer Journal*, 26(5), 509, 1990.

Stewart K.R., *Polymer Preprints*, 30(2), 575, 1989.

Wurm B.,Keul H.,Hocker H., *Macromolecules*, 25, 2977, 1992.

Wurm B., Keul H., Hocker H., Sylvester G., Leitz E., Ott K.H., *Makromol. Chem., Rapid Commun.*, 13, 9, 1992.

Yeh J., Kuo J., Chen C., *Journal of Applied Polymer Science*, 50, 1671, 1993.

Yn M., Ma C.M., *Journal of Applied Polymer Science*, 53, 213, 1994.

* cited by examiner

PROCESS FOR THE PRODUCTION OF A POLYMERIZED MATERIAL AND THE PRODUCT PRODUCED THEREBY

CROSS REFERENCE TO RELATED APPLICATIONS

This Application claims the benefit of International Application No. PCT/CA97/00531 filed pursuant to the Patent Cooperation Treaty and having an International Filing Date of Jul. 29, 1997, and further claims the benefit of United States of America Provisional Application No. 60/022,417 filed Jul. 30, 1996.

FIELD OF INVENTION

The present invention relates to a process for the preparation of a polymerized material from an organic amide monomer and an organic carbonate and to the product produced thereby, being the polymerized material. Preferably, the organic amide monomer is comprised of $\epsilon$-caprolactam and the organic carbonate is selected from the group consisting of polycarbonates, cyclic oligomers and mixtures thereof.

BACKGROUND OF INVENTION

There has been a remarkable growth in the large scale engineering applications of fiber reinforced plastics for over two decades. Such high performance materials, often referred to as composite materials, tend to possess preferred properties such as a relatively high strength and stiffness coupled with a relatively light weight. Specifically, the advantages of composite materials appear when the modulus per unit weight and strength per unit weight are considered. The tendency towards a higher specific modulus and specific strength in composites means that the weight of products incorporating them may be reduced.

Fiber reinforced plastics are typically comprised of a matrix polymer and a dispersed fiber phase, and are generally micro composites due to the small diameter of the fiber materials. Further, in fiber-filled composite materials, there are basically three regions: fiber, matrix and the interface between the fiber and matrix. The interfacial layers play an important role in the Theological and mechanical properties of composites since stresses acting on the matrix are transmitted to the fiber across the interface. Only with an effective transmittal of those stresses can the greater strength properties of the fiber be exploited. Therefore, good adhesion between the matrix and fiber is required in order to achieve the desired mechanical properties.

However, there is a tendency for fiber-reinforced plastics to exhibit poor adhesion between the matrix and fiber or filler particle surfaces as a result of their dissimilar natures. For example, the filler or reinforcing agent is usually hydrophilic and the matrix is generally hydrophobic. Moreover, when the fiber is hydrophilic, it can adsorb water, which tends to decrease the impact resistance of the composite material significantly. For example, a matrix such as Nylon 6 (trademark), due to its moisture sensitivity, can allow water molecules to diffuse and reach the fiber surface, thereby resulting in delamination of the interface. Thus, in such materials, adhesion between the fiber and the matrix is generally poor.

Many attempts have been made to improve the interfacial adhesion between the fiber surface and the matrix in order to produce a high performance composite material with superior properties. Such attempts include etching of the fibers, plasma treatment of the fibers, the use of a coupling or compatibilizing agent, and the use of block or graft copolymers.

A number of copolymers of $\epsilon$-caprolactam and non carbonate co-monomers have been synthesized by several researchers. Copolymers are defined as polymer chains containing two or more repeat units chemically linked to each other in some way. Depending on the sequence of these different repeat units, copolymers can be further classified into various types, viz. random copolymers, alternating copolymers, graft copolymers and block copolymers.

Block copolymers are comprised of chemically dissimilar, chemically connected segments. Their sequential arrangement can vary from "A-B" type structures, containing two segments only (di-block copolymers), to "A-B-A" block copolymers with three segments (tri-block copolymers), to multi-block "(-A-B-)$_n$" systems possessing many segments (multi-block copolymers). Block copolymers usually exhibit improved interphase adhesion resulting from the microphase morphology of the copolymer, which can produce a relatively good balance of mechanical properties.

The strategy generally adopted for synthesizing these copolymers is an outcome of the nature of the mechanism of polymerization of $\epsilon$-caprolactam to Nylon 6™, as described further below. In the synthesis of Nylon 6™, an N-acyllactam is necessary for the initiation of the chain. Thus, if a preformed polymer (which is to be copolymerized with Nylon 6™) is capped at either one or both ends with a lactam unit in such a way that an active N-acyllactam is produced, this polymer, which is actually an N-acyllactam, could serve as an activator in the polymerization of Nylon 6™. Consequently, $\epsilon$-caprolactam could be polymerized from the end of the polymeric activator by the usual ring-opening technique, thereby producing a block copolymer of the two homopolymers.

Using this technique, Keul H. et al., *European Polumer Journal*, 28(6), 611(1992) made an attempt to synthesize an A-B block polymer with an aliphatic polycarbonate block (A) and a Nylon 6™ block (B). Their procedure contemplated capping of the "living" poly(2,2-dimethyltrimethylene carbonate) chains with $\epsilon$-caprolactam moieties to give an N-acyllactam. However, they discovered that alkali metal-based catalysts fail to polymerize $\epsilon$-caprolactam in the presence of the aliphatic carbonate chain.

Wurm B. et al. in *Macromolecules*, 25 2977 (1992) and in *Makromol. Chem., Rapid Commun.*, 13, 9 (1992) attempted to employ a different strategy to synthesize poly(2,2-dimethyltrimethylene carbonate)-Nylon 6™ block copolymers. They used "living" poly(2,2-dimethyltrimethylene carbonate) chains as initiators, unlike the above (wherein polymers were capped to give activators), to polymerize $\epsilon$-caprolactam in order to yield the desired block copolymers. This route is well-known for making block copolymers of poly(2,2-dimethyltrimethylene carbonate) with certain other polymers. However, their study showed that alternating, rather than block, copolymers of these two homopolymers were obtained by this process.

Further, sodium hydride is a commonly used initiator in the polymerization of $\epsilon$-caprolactam to Nylon 6™, both commercially and for research purposes. However, sodium hydride is known to hinder the polymerization of $\epsilon$-caprolactam in the presence of aliphatic carbonates [Krimm H. et. al. *Chemical Abstracts*, 97, 93020x (1982) and Krimm H. et. al. *Chemical Astracts*, 97, 56407h (1982)].

Keul H. et. al. similarly showed that in the presence of an aliphatic polycarbonate, the active species (the metal caprolactamate) in the polymerization of ε-caprolactam, with alkali metals as counterions, reacts with a carbonate group of the carbonate monomer or polymer rather than with an activated ε-caprolactam moiety. This leads to breaking down of the polycarbonate chains and simultaneous consumption of the initiator. Eventually all of the initiator is used up so that there is no possibility of any polymerization taking place.

Blending of two or more polymers also provides another route for the development of new materials for engineering applications. Polymer blends are defined as mixtures of two or more polymers or copolymers in which the individual polymer chains do not react with each other chemically. Polymer blends can be homogeneous (miscible) or heterogeneous (immiscible), although the vast majority of blended composites consist of pairs or groups of immiscible polymers. This means that the product is not a homogeneous, single-phase material but is composed of a matrix material and one or more dispersed phases.

Ideally, two or more polymers may be blended to form a wide variety of random or structured morphologies to obtain products that potentially offer desirable combinations of characteristics. However, it is often difficult or impossible in practice to achieve these potential combinations through simple mechanical blending. As mentioned earlier, the two polymers are frequently thermodynamically immiscible, which precludes generating a truly homogeneous product.

These problems may be alleviated by the presence of certain polymeric species, such as a block or graft copolymer, suitably chosen. It is generally believed that this is a result of their ability to alter the interfacial situation. Such species, as a consequence, are often referred to as "compatibilizers", which is analogous to the term "solubilizers" used in the colloid field to describe the effect surfactants have on the ability to "mix" oil and water. The general view is that a properly chosen block or graft copolymer can preferentially locate at the interface between the two phases. As well, newer technology provides for reactive blending. This technique involves in situ reaction between the homopolymers by means of adding a reactive ingredient: such as ionomers, adducts of maleic or fumaric acids (or their anhydrides), or succinic copolymers.

Cortazar M. et. al., *British Polymer Journal*, 21, 395 (1989) have theorized that interchange reactions may occur in the Nylon 6™/polycarbonate system in a high temperature melt state. In their investigation, a blend of composition 50/50 was originally prepared by a solution blending process at room temperature using phenol/methanol and later maintained in the melt state at 250° C. in a calorimetric pan under a nitrogen atmosphere for different periods of time. These were then analyzed with the help of calorimetric analyses by cooling and reheating at a controlled rate. The heats of melting and crystallization and the respective temperatures of these transitions appeared to drop with increasing reaction time in the pan. This suggested that interchange reactions may have taken place in the blend during heat treatment.

Gattiglia E. et. al., *Journal of Applied Polymer Science*, 38, 1807 (1989) prepared blends of Nylon 6™ and polycarbonate by shearing the polymers in a single screw extruder at 250° C. They studied the thermal properties and morphology of the system over the entire composition range. Also, blend samples were treated with solvent and the extracts were analyzed using gel permeation chromatography (GPC) after they were sheared through the extruder. The GPC analysis showed degradation of polycarbonate which may have been due to reactions taking place in the systems. The Nylon 6™ melting point as well as polycarbonate glass transition temperature decreased with increasing polycarbonate concentration in the mixture. The scanning electron micrographs showed that the blends were immiscible at all compositions except for the one which had 95% Nylon 6™. As a result, it was theorized that reactions taking place in these blends may be responsible for degradative effects observed for polycarbonate.

In the second part of their work, Gattiglia E. et. al., *Journal of Applied Polymer Science*, 41, 1411 (1990) investigated the morphology-mechanical property relationships in the above blends. The impact strength of polycarbonate dropped by a factor of 10 on addition of 5%, Nylon 6™ whereas that of Nylon 6™ increased by a factor of 2 when 5% or 10% polycarbonate was present. This suggested that compatibilization due to chemical reactions may take place in the system at higher Nylon 6™ concentrations. Other mechanical properties of the blends were generally found to be poorer than the parent polymers themselves.

In all the above experiments by Gattiglia E. et. al., however, the effect of shearing time on the blend morphology and mechanical properties was not specifically studied. In Gattiglia E. et. al., *Journal of Applied Polymer Science*, 46, 1887 (1992), they used a batch mixer in place of an extruder and varied the time of blending for these blends. Their results showed that following longer periods of mixing, the blends appeared to demonstrate improved compatibility. Nonetheless, the mechanical properties did not show any improvement over those of the pure homopolymers except for the tensile modulus of a blend with 90% Nylon 6™. This was attributed to the compensation that occurred due to fragmentation of polycarbonate chains during the course of the mixing, i.e. greater degradation of polycarbonate chains resulted from longer blending times.

All the above work shows that Nylon 6™ and polycarbonate are immiscible polymers which may show some compatibility due to reactions possibly taking place in site during high-temperature shearing of the two polymers together. However, the improvement of mechanical properties, the ultimate goal of mixing, has to date not been achieved to the desired extent in such blends.

As a result, there is a need in the industry for a process for the production of a polymerized material having improved mechanical properties as compared to known polymerized materials. Further, there is a need for a process for the production of a polymerized material from an organic amide monomer, preferably ε-caprolactam, and an organic carbonate, preferably selected from the group consisting of polycarbonates, cyclic oligomers and mixtures thereof. There is also a need for a polymerized material having improved mechanical properties as compared to known polymerized materials. As well, there is a need for a polymerized material produced by the polymerization of an organic amide monomer, preferably ε-caprolactam, and organic carbonate, preferably selected from the group consisting of polycarbonates, cyclic oligomers and mixtures thereof.

SUMMARY OF INVENTION

The present invention relates to a process for the production of a polymerized material having desirable mechanical properties, as compared to known polymerized materials. More particularly, the present invention relates to a process for the production of the polymerized material from an organic amide monomer and an organic carbonate. Preferably, the organic amide monomer is comprised of ε-caprolactam. Further, preferably the organic carbonate is selected from the group consisting of polycarbonates, cyclic oligomers and mixtures thereof.

The present invention also relates to a polymerized material having desirable mechanical properties, as compared to known polymerized materials. More particularly, the polymerized material is produced by the polymerization of an organic amide monomer and an organic carbonate. Preferably, the organic amide monomer is comprised of ε-caprolactam. Further, preferably the organic carbonate is selected from the group consisting of polycarbonates, cyclic oligomers and mixtures thereof.

In a first aspect of the invention in a process form, the invention is comprised of a process for the preparation of a polymerized material from an organic amide monomer and an organic carbonate, the process comprising the following steps:

(a) heating an amount of the organic amide monomer to a temperature above its melting point;

(b) first mixing an amount of an anionic initiator with at least a portion of the amount of heated organic amide monomer to produce an amount of activated monomer, wherein the anionic initiator is not comprised of an alkali metal;

(c) second mixing an amount of the organic carbonate with at least a portion of the amount of heated organic amide monomer to produce an amount of dissolved organic carbonate;

(d) polymerizing the amount of heated organic amide monomer and the amount of activated monomer in the presence of the amount of dissolved organic carbonate to produce the polymerized material.

In a second aspect of the invention in a product form, the invention is comprised of a polymerized material produced by the polymerization of an organic amide monomer in the presence of an organic carbonate. Although any suitable process for producing the material may be used, the polymerized material is preferably produced by the process of the within invention, described herein. Further, the polymerized material may be further comprised of a filler, as described below, thereby resulting in a composite material comprising the polymerized material and the filler. Again, although any suitable process for producing the composite material may be used, the composite material is preferably produced by the process of the within invention, described herein.

In the first and second aspects of the invention, the organic monomer may be comprised of any suitable organic amide monomer capable of being polymerized in the presence of the selected organic carbonate and of producing the polymerized material. Preferably, the organic amide monomer is comprised of an organic amide monomer which is able to produce the activated monomer in the presence of the selected anionic initiator, wherein the activated monomer and the organic amide monomer are capable of being polymerized in the presence of the selected organic carbonate. In the preferred embodiment, the organic amide monomer is comprised of a cyclic organic amide monomer. Further, the cyclic organic amide monomer is preferably comprised of ε-caprolactam.

Further, in the first and second aspects, the organic carbonate is comprised of any organic carbonate capable of facilitating the polymerization of the selected organic amide monomer and the activated monomer. The organic carbonate may be comprised of any aliphatic or aromatic carbonate, however, the organic carbonate is preferably comprised of an aromatic carbonate. In the preferred embodiment, the aromatic carbonate is of a type selected from the group consisting of polycarbonates, cyclic oligomers and mixtures thereof.

Any amount of the organic carbonate may be used in the process or be present in the material. However, preferably the amount of organic carbonate is a finite amount which is less than about 5% by weight of the combined amount of the organic amide monomer and organic carbonate. Further, the amount of organic carbonate is preferably a finite amount which is less than about 2.5% by weight, and more preferably less than about 1% by weight, of the combined amount of the organic amide monomer and organic carbonate. In the preferred embodiment, the amount of organic carbonate is between about 1% and about 5% by weight, and more preferably between about 1% and 2.5% by weight, of the combined amount of the organic amide monomer and organic carbonate.

In the first aspect of the invention in its process form, the anionic initiator may be comprised of any strong base which is not comprised of an alkali metal and which is capable of initiating the selected organic amide monomer to produce the activated monomer. The anionic initiator is preferably comprised of a metallic compound such as a magnesium halide and is more preferably comprised of an organic magnesium halide. In the preferred embodiment, the anionic initiator is comprised of isobutyl magnesium bromide.

The polymerization step of the process may be performed at any temperature permitting the polymerization of the organic amide monomer and the activated monomer in the presence of the organic carbonate and permitting the production of the polymerized material. Preferably, the polymerization step is performed at a temperature between the melting point of the organic amide monomer and about 150° Celsius. In the preferred embodiment, the polymerization step is performed at a temperature between about 100° Celsius and about 150° Celsius, and more preferably, between about 120° Celsius and about 150° Celsius.

Further, in the first aspect, in the preferred embodiment, the second mixing of the organic carbonate with the heated organic amide monomer and the polymerization step are conducted in a substantially inert environment. Preferably, the inert environment comprises a nitrogen atmosphere.

The first mixing step and the second mixing step may be performed using the same portion of the amount of heated organic amide monomer. In this case, the first mixing step is preferably performed prior to the second mixing step. However, in the preferred embodiment, the first mixing step and the second mixing step are performed using two separate portions of the amount of the heated organic amide monomer, which portions are subsequently combined for the performance of the polymerization step.

As well, in the first aspect of the invention, the polymerization step is preferably performed in the presence of a filler so that the filler is incorporated into the polymerized material to form a composite material. Further, as stated above, in the second aspect of the invention, the polymerized material is preferably further comprised of the filler, thereby resulting in the composite material. Any filler compatible with the material, such that the composite material may be formed, may be used. Preferably, the filler is comprised of a material able to provide reinforcement to the polymerized material. In the preferred embodiment, the filler is comprised of a silicate. The silicate is preferably comprised of glass fibers.

In the second aspect of the invention in its product form, the polymerized material may have any morphology compatible with producing the desired material, having the desired mechanical and structural properties. However, preferably the polymerized material comprises a copolymer of the organic amide monomer and the organic carbonate. Further, although the copolymer may be of any type, the copolymer is preferably comprised of a block copolymer. Further, the polymerized material further preferably comprises a blend of the copolymer and the organic carbonate and may also comprise an amount of either or both organic amide monomer and organic amide polymer.

DETAILED DESCRIPTION

The present invention relates to a process for the production of a polymerized material having desirable mechanical properties, as compared to known polymerized materials. More particularly, the present invention relates to a process for the production of the polymerized material from an organic amide monomer and an organic carbonate.

The present invention also relates to a polymerized material having desirable mechanical properties, as compared to known polymerized materials. More particularly, the polymerized material is produced by the polymerization of an organic amide monomer in the presence of an organic carbonate. Although any suitable process for producing the material may be used, the polymerized material is preferably produced by the process of the within invention, described herein.

Further, the polymerized material is preferably further comprised of a filler, as described below, thereby resulting in a composite material. Again, although any suitable process for producing the composite material may be used, the composite material is preferably produced by the process of the within invention, described herein. Thus, in essence, the polymerized material is used as a matrix for the filler reinforced composites.

The polymerized material of the within invention may have any chemical structure or morphology compatible with producing the desired material, having the desired mechanical and structural properties. However, as discussed in detail below, it is believed that the polymerized material of the within invention comprises a copolymer of the organic amide monomer and the organic carbonate. Further, although the copolymer may be of any type, the copolymer is believed to be comprised of a block copolymer.

Further, in the within invention, a portion of the organic carbonate is believed to retain its identity throughout the course of the polymerization reaction. The polymerized material may also contain an amount of either or both organic amide monomer and organic amide polymer. Thus, the polymerized material may be "contaminated," to at least a minor degree, by organic amide monomer or by homopolymers of organic carbonate and/or organic amide. Accordingly, the polymerized material is believed to comprise a blend of the copolymer and organic carbonate and may also comprise an amount of either or both of organic amide monomer and organic amide polymer. In particular, it is believed that the polymerized material comprises a blend of block copolymers of the organic amide monomer and the organic carbonate, homopolymers of the organic carbonate and perhaps an amount of either or both of organic amide monomer and organic amide polymer.

As stated previously, the properties of composite materials depend on the types of matrix, filler or fiber, and their interface structure. To choose the matrix and the filler, consideration must be given to their properties separately and also their interfacial adhesion. The adhesion between the filler and the matrix plays an important role in determining the mechanical performance of the composite material. In particular, in order to achieve a relatively high strength composite, adequate bonding (either physical or chemical) must occur between the matrix and the filler. The bonding is essential if the stress has to be transferred effectively to the filler fibers. In the absence of such adhesion, the matrix and the filler fibers tend to delaminate after a certain value of stress is reached and the composite eventually fails.

The organic monomer of the within invention may be comprised of any suitable organic amide monomer able to be polymerized in the presence of the selected organic carbonate. In the preferred embodiment, the organic amide monomer is comprised of a cyclic organic amide monomer. Further, the cyclic organic amide monomer is preferably comprised of ε-caprolactam.

Nylon 6™ is synthesized by the anionic ring-opening polymerization of the monomer ε-caprolactam. In essence, the within invention is directed at the production or synthesis of a material of Nylon 6™ and the organic carbonate by the anionic ring-opening polymerization ot ε-caprolactam in the presence of the organic carbonate. Thus, an understanding of the polymerization reaction of ε-caprolactam to produce Nylon 6™ will aid in the understanding of the process of the within invention.

Nylon 6™ is a member of the class of polymers called polyamides. Nylon fibers characteristically have a good tensile strength and elastic modulus and are relatively inexpensive. Some of the physical properties of Nylon 6™ are given in Table 1.

TABLE 1

| Properties of a typical commercial grade of Nylon 6 ™ | |
|---|---|
| Properties | Values |
| Density, $10^3$ kgm$^3$ | 1.13 |
| Crystalline melting point, °C. | 215 |
| Impact strength (Izod), J/m | 32–53 |
| Elastic modulus, GPa [from Modern Plastics Encyclopedia] | 2.42 |
| Tensile Strength, MPa | 76 |
| Elongation to fracture, % | 100–200 |
| Heat distortion temperature (at 1.86 MPa), ° | 60 |
| Water absorption at saturation (at 25° C.), % | 9.0 |

As stated, Nylon 6™ is synthesized by the ring-opening polymerization of the monomer ε-caprolactam. This monomer can be prepared inexpensively from phenol by the following reaction sequence:

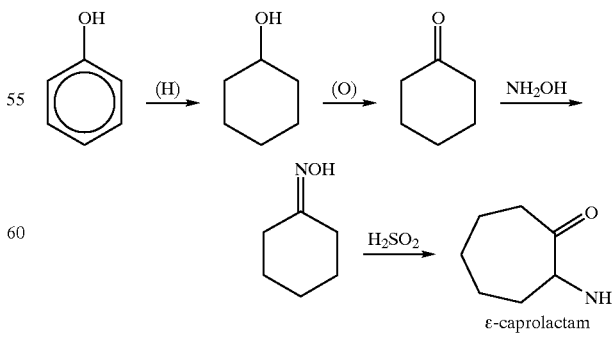

ε-Caprolactam contains both acid (—C═O) and amine (—N—H) groups which are divided during the ring-opening initiation but are found together in the amide bond(—NH—CO—) when polymerized. The structure of Nylon 6™, thus, can be written as:

Nylon 6™ may be polymerized in sitzi in a mold. In this process, rapid polymerization is achieved by the use of anionic initiators. Anionic polymerization of caprolactam is effected by strong bases ($B^-M^+$) such as metal amides, metal hydrides and alkali metals. In this type of polymerization, a mixture of caprolactam and initiator is injected into a mold at a lower temperature at which polymerization is not effective. Eventually the mold temperature is raised and the polymerization is carried out. The reaction temperature is about 150° C. The scheme of polymerization by the ring-opening anionic technique is as follows.

initiation:
Caprolactam first reacts with the base to give its metal derivative:

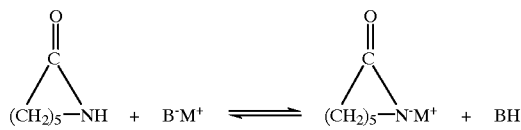

[I]

The lactam anion I (the activated monomer) then reacts with the monomer in the second step of the initiation process by a ring-opening transamidation:

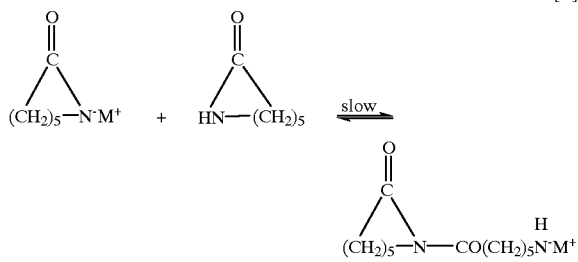

[II]

The primary amine anion II is not stabilized by conjugation with a carbonyl group. It is highly reactive and rapidly abstracts a proton from the monomer to form the amide dimer III, N-(ε-aminocaproyl)caprolactam, and regenerate the lactam anion:

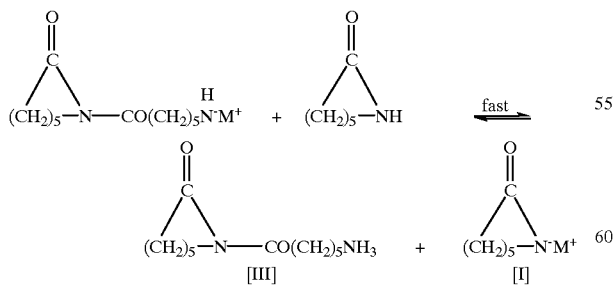

The amide dimer III is the actual initiating species necessary for the onset of polymerization. The initial induction period of the lactam polymerization is slow because the amide dimer builds up slowly.

Propagation:
Propagation is the reaction between a propagating N-acyllactam species (III) and the lactam anion (I).

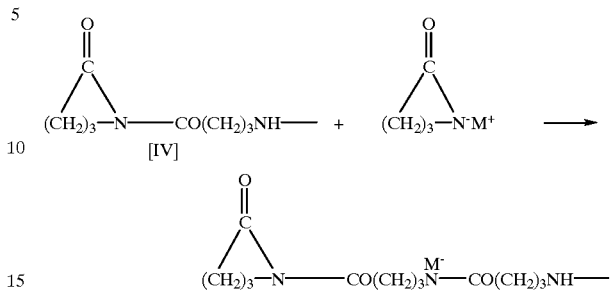

which is followed by fast proton exchange with the monomer:

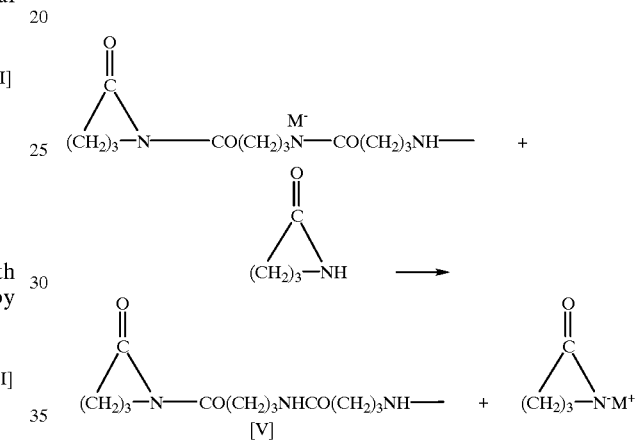

The anionic polymerization of lactams is different from other polymerizations. First, the propagating center is the cyclic amide linkage of the N-acyllactam instead of a radical, carbonation, or carbenium ion. Second, it is the lactam anion, called the activated monomer, instead of the monomer that adds to the propagating chain. The concentrations of both propagating species and the activated monomer are determined by the concentration of the anionic initiator.

Since the induction of lactam polymerizations by using a strong base initiator alone tends to be very slow, the rate of polymerization is typically increased by adding acylating agents or activators to the monomer. The acylation agents or activators, such as isocyanates, acid chlorides and hydrides, inorganic anhydrides, and others, form an amide when reacting with the monomer. For example, with an isocyanate:

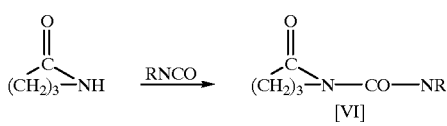

By reaction in the presence of an isocyanate, ε-caprolactam may be converted rapidly to an N-acylcaprolactam (VI). Initiation period in this case refers to the reaction of the N-acylcaprolactam with the activated monomer followed by a fast proton exchange with the monomer:

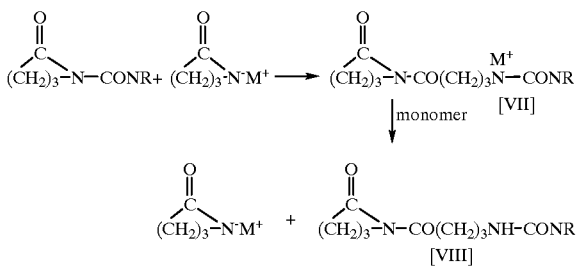

The species VII and VIII correspond to species II and III in polymerization in the absence of an acylating agent. The use of an acylating agent eliminates the induction period as a result of which the polymerization rate is higher and the reaction can be carried out at a lower temperature. Propagation follows in the same manner as for propagation of species IV.

Thus, in the production of Nylon 6™, the strong base is referred to as the initiator or the anionic initiator and the acylating agent as the activator. The polymerization rate depends on the concentrations of both the initiator and the activator.

As indicated, in the within invention, the organic amide monomer, preferably ε-caprolactam, is polymerized in the presence of the organic carbonate. As described further below in detail, the ε-caprolactam is initiated by an anionic initiator to produce an amount of an activated monomer. The organic amide monomer and the activated monomer are then polymerized in the presence of the organic carbonate. It is believed that the organic carbonate acts as an activator in the polymerization reaction. Thus, the organic carbonate may be comprised of any organic carbonate able to facilitate the polymerization of the selected organic amide monomer, being ε-caprolactam in the preferred embodiment, and the activated monomer.

Further, the organic carbonate may be comprised of any aliphatic or aromatic carbonate, however, the organic carbonate is preferably comprised of an aromatic carbonate. In the preferred embodiment, the aromatic carbonate is of a type selected from the group consisting of polycarbonates, cyclic oligomers and mixtures thereof.

Polycarbonates may be defined as polymers containing recurring carbonate groups (—O—CO—O—) in the main chain. In general, these polymers have high softening points together with thermal and hydrolytic stability. The polycarbonates based on 2,2-bis(4"-hydroxyphenyl) propane are commonly called Bisphenol A polycarbonate. Table 2 sets out the typical properties of polycarbonates.

TABLE 2

| Properties of a typical commercial grade of Polycarbonate | |
|---|---|
| Properties | Values |
| Density, $10^3$ kgm$^3$ | 1.2 |
| Crystalline melting point, ° C. | 220–230* |
| Impact strength (Izod), J/m | 640–850 |
| Elastic modulus, GPa [from Modern Plastics Encyclopedia] | 2.38 |
| Tensile Strength, MNm$^{-2}$ | 55–69 |
| Elongation to fracture, % | 60–100 |

TABLE 2-continued

| Properties of a typical commercial grade of Polycarbonate | |
|---|---|
| Properties | Values |
| Glass transition temperature, ° C. | 149 |
| Water absorption (max. at 23° C.), % | 0.35 |

*Melting point often cannot be detected because the crystals constitute such a small fraction of this primarily amorphous polymer.

Polycarbonates may be considered as polyesters of carbonic acid and polyhydroxy compounds (e.g. Bisphenol A). Carbonic acid itself does not take part in the normal esterification process, instead reactive derivatives must be used. Phosgene and diphenyl carbonate are the two derivatives most used in commercial operations. Bisphenol A is prepared from phenol and acetone at temperatures below 70° C. using hydrogen chloride as a catalyst. Phosgene (or carbonyl chloride) is obtained by the action of chlorine on carbon monoxide at about 200° C. in the presence of charcoal as a catalyst. Diphenyl carbonate is prepared by passing phosgene through a solution of phenol in aqueous sodium hydroxide in the presence of an inert solvent such as methylene chloride.

There are two main condensation polymerization methods for the manufacture of polycarbonate, namely direct phosgenation and ester exchange. Both these methods are conventional, condensation polymerization techniques in which byproducts are generated and have to be removed from the reaction mixture in order to obtain the final product.

However, other researchers have recently discovered a new ring-opening polymerization technique for the synthesis of polycarbonate. In this reaction, Bisphenol A cyclic carbonate oligomers are polymerized using anionic initiators by a ring-scission mechanism. The polymerization of these cyclic oligomers proceeds by a living ring-opening polymerization process producing high molecular weight linear polycarbonate without significant quantities of rings remaining in the product.

In experimentation relating to the preferred embodiment, the polycarbonate was purchased from Scientific Polymer Products and was received in pelletized form. The weight-average molecular weight of the polycarbonate (as reported by the supplier) was 67,000, as compared to its number-average molecular weight of ~7,500 (as determined by vapor pressure osmometry by the Microanalytical Laboratory, Department of Chemistry, University of Alberta, Canada). However, it has been found that the dissolution of the pelletized polycarbonate in the ε-caprolactam in the process of the within invention tended to significantly delay the process. Therefore, the polycarbonate is preferably converted to a powdered form prior to its use. The powdered form of the polycarbonate has been found to go into solution faster. The polycarbonates may be converted to a powdered form by any suitable process, such as by a solution-precipitation technique.

The carbonate cyclic oligomer used in the within process may be prepared by any conventional process for its production. However, in the preferred embodiment, the cyclic oligomer is prepared via an interfacial amine-catalyzed hydrolysis/condensation of aromatic bischloroformates, which leads selectively to cyclic, oligomeric carbonates.

Any amount of the organic carbonate capable or producing the polymerized material may be used in the process or be present in the polymerized material. However, it is theorized that the greater the percentage of organic carbonate used in the polymerization, the greater tendency there is towards a lower molecular weight of the polymerized material. Thus, it is theorized that the amount of the organic carbonate should be high enough for the organic carbonate to lend or impart its properties to the polymerized material, while being low enough to achieve a relatively high molecular weight of the material.

It has been found that one important parameter governing the molecular weight of Nylon 6™ synthesized by a ring-opening polymerization technique, according to the chemistry and principles of mass balance, is the concentration of the activator in the polymerization mixture. For example, if a large number of ε-caprolactam molecules are activated by a high activator concentration in a given mixture, a large number of Nylon 6™ chains will be present in the polymer obtained. For simplicity, assuming that monodisperse Nylon 6™ is a product of the anionic ring-opening polymerization technique, for a given mass of the polymer, its molecular weight will be inversely proportional to the number of chains present. The number of chains present is in turn equal to the number of chains activated by the activator. Therefore, the molecular weight achieved in the polymerization of Nylon 6™ is, in some way, in inverse function of the activator concentration.

This inverse relationship between the activator concentration and the molecular weight appears to be consistent with the experimental data for the polymerized material set out below. In particular, it has been found that either polycarbonate or cyclic-oligomer concentrations greater than 5% by weight of the combined amount of the organic amide monomer and the organic carbonate fail to produce good materials. When as high as 10% by weight of polycarbonate is used, the material is believed to contain a very low-molecular weight species comprising unreacted monomer and low-molecular weight oligomer.

For these reasons, and as a result of the experimental data set out below, the amount of the organic carbonate, and in particular the polycarbonate, cyclic oligomer or mixture thereof, used in the within process and present in the polymerized material is preferably a finite amount which is less than about 5% by weight of the combined amount of organic amide monomer and organic carbonate. Further, it has been found that the amount of organic carbonate may be a finite amount which is less than about 2.5% by weight, and preferably less than about 1% by weight, of the combined amount of organic amide monomer and organic carbonate. In the preferred embodiment, the amount or organic carbonate is between about 1% and about 5% by weight, and more preferably between about 1% and 2.5% by weight, of the combined amount of organic amide monomer and organic carbonate.

Finally, as stated, the polymerized material may be further comprised of a filler, thereby resulting in a composite material comprising the polymerized material and the filler. Any filler compatible with the material, such that the composite material may be formed, may be used. However, preferably, the filler is comprised of a material able to provide reinforcement to the polymerized material.

Preferably, the filler is comprised of a silicate. Any silicate able to act as a reinforcing agent for the material may be used. However, in the preferred embodiment, the silicate is comprised of glass fibers. In this case, it has been found that the organic carbonate provides the necessary glass-adhesion properties to the polymerized material.

There are different types of glass fibers for different purposes, for example, type C (for resisting corrosion), E (for electrical), and S (for high silica content). C-glass can resist chemical corrosion better than E-glass but is more expensive than E-glass and also has poorer mechanical properties. S-glass has a very high tensile modulus but is, again, more expensive than E-glass. Because of the price advantage of E-glass, most continuous glass fiber (about 90%) manufactured is of the E-glass type; it also draws well and has relatively good strength, stiffness, electrical and weathering properties. Thus, E-glass fibers are used in the preferred embodiment of the invention.

Typical compositions of glasses of different types used for glass fiber in composite materials are shown in Table 3. Common glass fibers are based on silica (about 50–60% $SiO_2$) and oxides of calcium, boron, sodium, aluminum and iron.

TABLE 3

Composition of glass used for fiber manufacture
(all values in wt %)

| Components | C-glass | E-glass | S-glass |
|---|---|---|---|
| $SiO_2$ | 64.4 | 52.4 | 64.4 |
| $Al_2O_3Fe_2O_3$ | 4.1 | 14.4 | 25.0 |
| CaO | 13.4 | 17.2 | — |
| Mg) | 3.3 | 4.6 | 10.3 |
| $Na_2O, K_2O$ | 9.6 | 0.8 | 0.3 |
| $B_2O_3$ | 4.7 | 10.6 | — |
| BaO | 0.9 | — | — |

The properties of glass fibers are quite isotropic. Young's modulus and thermal expansion coefficients are the same along the fiber axis and the perpendicular direction because the three-dimensional structure is isotropic. The properties of E-glass are shown in Table 4.

TABLE 4

Properties of E-glass at 20° C., measured in fiber form with diameters in the range 8–14 μm

| Properties | Values |
|---|---|
| Density, $10^3$ kgm$^3$ | 2.56 |
| Young's modulus (tensile, along fiber axis), GNm$^{-2}$ | 76 |
| Modulus (perpendicular to fiber axis), GNm$^{-2}$ | 76 |
| Tensile Strength, GNm$^{-2}$ | 1.4–2.5 (typical) |
| | 3.5 (freshly drawn) |
| Elongation to fracture, % | 1.8–3.2 (typical) |
| Coefficient of thermal expansion (0 to 100° C.), $10^{-6}$ K$^{-1}$ | 4.9 |
| Thermal conductivity (parallel to fiber axis), Wm$^{-1}$ K$^{-1}$ | 1.04 |

In experimentation relating to the preferred embodiment, short, clean glass fibers (approximately 0.2 mm in length and 11 μm diameter) were obtained from the Plastics Engineering Department of the Northern Alberta Institute of Technology (N.A.I.T.), Edmonton, Alberta, Canada. These glass fibers are dried before using them to make the composite.

Glass has a substantially higher modulus and tensile strength compared to Nylon 6™ or polycarbonate (see Tables 1, 2 and 4 for a comparison between glass and Nylon 6™ or polycarbonate). Therefore, the incorporation of glass fibers into the polymerized material is anticipated to produce a composite material stiffer and stronger than the polymerized material, if the load can be transmitted to the glass. For example, when a composite is subjected to tension, the stress developed in the matrix is transmitted to the glass fibers through the interface. Thus, for a given strain, the stress sustained without fracture in the composite is much higher than it would be in the matrix alone. Thus, the assumption underlying the high strength of the composite material is that of adequate bonding (either physical or chemical) between the material and the glass fibers. The bonding is essential if the stress has to be transferred effectively to the fibers. In the absence of such adhesion, the matrix material and the glass fibers will tend to delaminate after a certain value of stress is reached.

When producing composite materials incorporating glass fibers, it has been found that three factors play a significant role in determining the mechanical properties of the resulting composite material. These factors are the glass-fiber content, the length of glass fibers and the orientation of glass fibers in the matrix. First, the glass volume fraction plays an important role since the stress supported is given by a simple volume additivity rule for long aligned-fiber composites. Second, the reinforcing efficiency of short aligned fibers is lower than that of long aligned fibers due to a larger number of fiber-ends. Lastly, due to the random orientation of fibers (lack of alignment), the stress developed in the direction of their own axis (which is not the same as the direction of applied load) contributes only fractionally to the stress in the material in the direction of the applied load. Thus, these three factors may be varied to achieve a particular result in the composite material.

The process for the preparation of the polymerized polymer is a relatively low temperature process, as described further below, and a relatively low viscosity process in order to provide ease of processing. The process is comprised of the step of heating an amount of the organic amide monomer to a temperature above its melting point such that the organic amide monomer is substantially melted. In the preferred embodiment, the melting point of $\epsilon$-caprolactam is about 72° C. Thus, the heating step heats the amount of the $\epsilon$-caprolactam to a temperature above 72° C.

The heating step may be performed using any conventional apparatus, device or method for heating which is suitable for heating the organic amide monomer to the required temperature. However, in experimentation relating to the preferred embodiment, the $\epsilon$-caprolactam was heated by placing it in a container and heating the container using an oil bath placed on a plate heater. Once the required temperature was achieved and the organic amide monomer was substantially melted, the temperature of the organic amide monomer was maintained at a temperature above its melt point.

An amount of an anionic initiator is then first mixed with at least a portion of the amount of the heated organic amide monomer. As a result, an amount of activated monomer is produced by the first mixing step. As well, an amount of the organic carbonate is second mixed with at least a portion of the amount of the heated organic amide monomer. As a result, an amount of dissolved organic carbonate is produced by the second mixing step. The first and second mixing steps may be performed using any conventional apparatus, device or method for stirring or mixing the particular components. However, during experimentation, a high speed stirring action was maintained throughout the first and second mixing steps by a magnetic stirrer.

As indicated, in the first mixing step, an amount of the anionic initiator is mixed with the heated organic amide monomer. The anionic initiator may be comprised of any strong base which is not comprised of an alkali metal and which is capable of initiating the selected organic amide monomer to produce the activated monomer. Further, the anionic initiator is preferably a metallic compound not comprising an alkali metal.

As indicated previously, sodium hydride, an alkali metal hydride, is a commonly used initiator in the polymerization of $\epsilon$-caprolactam to Nylon 6™. However, it has been found that sodium hydride hinders the polymerization of $\epsilon$-caprolactam in the presence of organic carbonates, and in particular, aliphatic carbonates. In the presence of aliphatic carbonates, the active species (the metal caprolactamate) in the polymerization of $\epsilon$-caprolactam, with alkali metals as counterions, reacts with a carbonate group of the carbonate monomer or polymer rather than with an activated $\epsilon$-caprolactam moiety. This leads to breaking down of the carbonate chains and simultaneous consumption of the initiator. Eventually all of the initiator is used up so that there is no possibility of any polymerization taking place. In particular, it has been found that the viscosity of the $\epsilon$-caprolactam-carbonate mixture remains practically unchanged after several hours, thereby suggesting that polymerization does not take place at all. It is anticipated that, as in the case of aliphatic carbonates, sodium hydride will be similarly ineffective for the polymerization of $\epsilon$-caprolactam in the presence of aromatic carbonates. It is also believed that other initiators containing or comprising alkali metals will exhibit similar characteristics to those exhibited by sodium hydride.

Accordingly, the anionic initiator is not comprised of alkali metals. Rather, the anionic initiator is preferably a metallic compound such as a magnesium halide and is more preferably an organic magnesium halide. In the preferred embodiment, the anionic initiator is comprised of isobutyl magnesium bromide. Isobutyl magnesium bromide has been widely used in the polymerization of Nylon 6™ and is known to give a high conversion of $\epsilon$-caprolactam. In experimentation relating to the preferred embodiment, the isobutyl magnesium bromide was obtained from Aldrich as a 2 M. solution in diethylether.

Any amount of anionic initiator capable of initiating the selected organic amide monomer may be used. Further, the amount of the anionic initiator is preferably sufficient such that the subsequent polymerization of the organic amide monomer and the activated monomer is not limited by the amount of the anionic initiator and the amount of the activated monomer produced thereby in the first mixing step. Rather, it is preferred that the polymerization be limited by the amount of the organic carbonate or activator used in the process.

In the preferred embodiment, 2 mol % of isobutyl magnesium bromide, based upon the weight of $\epsilon$-caprolactam used, is mixed with the heated $\epsilon$-caprolactam in the first mixing step. As a result, it is believed that activated monomer produced thereby is $\epsilon$-caprolactam magnesium bromide or MgBr-caprolactamate. When using sodium hydride in the polymerization of $\epsilon$-caprolactam to Nylon 6™, the activated monomer is Na-caprolactamate. It has been found that MgBr-caprolactamate has a lower nucleophilicity than Na-caprolactamate. Therefore, unlike the latter, MgBr-caprolactamate is not expected to be highly effective in breaking down the carbonate chain into smaller fragments. Accordingly, the polymerization of Nylon 6™ in the presence of carbonates, which was not possible using sodium hydride as the anionic initiator, may be achieved when isobutyl magnesium bromide is used instead.

As stated, the second mixing step is comprised of mixing an amount of the organic carbonate with at least a portion of the heated organic amide monomer to produce an amount of dissolved organic carbonate. The second mixing step is preferably performed for a period of time sufficient to dissolve the entire amount, or substantially the entire amount, of the organic carbonate in order to produce the dissolved organic carbonate. However, relatively small amounts of the organic carbonate may remain in an undissolved state.

Further, it has been found that the second mixing step is preferably conducted in a substantially inert environment in order to minimize the deterioration of the organic carbonate during the second mixing step. In the preferred embodiment, the inert environment comprises a nitrogen atmosphere.

Mixtures of ε-caprolactam and polycarbonate of up to 30% polycarbonate were evaluated for their miscibility ill the melt state. Concentrations higher than 30% polycarbonate were considered to be of not much interest since the viscosity of the concentrated solutions would be extremely high, making processing difficult. In experimentation relating to the preferred embodiment, 95 g. of ε-caprolactam ($T_m$=72° C.) were heated at a temperature of about 100° C. in a round-bottomed flask and 5 g. of polycarbonate were added to the flask under constant stirring. After some time (approximately 20 to 25 minutes) the solution was clear indicating that polycarbonate had dissolved. Similar solubility tests were conducted on mixtures with higher polycarbonate content and it was found that up to 25% (wt.) of polycarbonate could be dissolved in ε-caprolactam at temperatures ranging from 100 to 120° C. However, the time required for dissolution increased with the amount of polycarbonate. For example, the time required to dissolve 20% polycarbonate was about 2 hours at 110° C.

In subsequent elemental analysis of the extracted polycarbonate revealed the presence of nitrogen in the molecule, an element which is absent in pure polycarbonate, thereby indicating that scissions in the polycarbonate chain may have taken place as a result of chemical attack by ε-caprolactam. Such a drop in molecular weight is considered undesirable since the low-molecular weight polycarbonate would tend to possess poor mechanical properties.

As a result, it was found that an inert environment, and in particular a nitrogen atmosphere, was preferable during the dissolution process of the second mixing step and during the polymerization step. For example, when a nitrogen blanket was maintained about the polycarbonate/ε-caprolactam mixture, it was found that the molecular weight of polycarbonate remained practically unchanged on its dissolution in ε-caprolactam and subsequent extraction. However, the time required for dissolution almost doubled in the presence of a nitrogen blanket. Thus, it appears that in an inert environment only physical dissolution takes place in the mixture without any deteriorative effects on the polycarbonate chains.

In the preferred embodiment, a dry nitrogen is bubbled through the heated organic amide monomer for a period of time in order to remove at least a portion of any dissolved oxygen and water vapor. The organic carbonate is then added to the heated organic amide monomer while maintaining a nitrogen blanket over the mixture in a vessel.

The amount of the heated organic amide monomer and the amount of the activated monomer are then polymerized in the presence of the amount of the dissolved organic carbonate to produce the polymerized material. As indicated, an amount of undissolved organic carbonate may also be present during this polymerization step. Surprisingly, it has been found that when an initiator is used that does not comprise an alkali metal and where the polymerization step is conducted in the presence of an organic carbonate, it is not necessary to utilize a separate activator such as phenyl isocyanate in order to activate the polymerization of the organic amide monomer and the activated monomer.

The first mixing step and the second mixing step may be performed using the same portion of the amount of heated organic amide monomer. However, in this case, the first mixing step is preferably performed prior to the second mixing step. Where the second mixing step is performed first, and thus, the organic carbonate is added to the heated organic amide monomer prior to the anionic initiator, it has been found that little to no polymerization may occur. It is believed that the poor polymerization may be due to the high reactivity of the anionic initiator. As a result, the anionic initiator may react with the organic carbonate, which has been found to be highly susceptible to nucleophilic attack, rather than with the organic amide monomer. This undesirable reaction has been found to be avoidable by adding the anionic initiator to the heated organic amide monomer prior to adding the organic carbonate.

However, in the preferred embodiment, the first mixing step and the second mixing step are performed using two separate portions of the amount of the heated organic amide monomer, which portions are subsequently combined for the performance of the polymerization step. Where the organic carbonate is directly added to the mixture of heated organic amide monomer and anionic initiator, it has been found that the organic carbonate may not have a sufficient opportunity to dissolve in the heated organic amide monomer. Rather, there is a tendency for the heated organic amide monomer and the activated monomer to immediately commence polymerization upon the addition of the organic carbonate. As a result, a significant portion of the organic carbonate may be trapped within the matrix, rather than reacting with it. Accordingly, a less desirable polymerized material may be produced.

By performing the first and second mixing steps in two separate portions of the heated organic amide monomer, the organic carbonate is permitted to effectively dissolve in a first portion while the anionic initiator produces the activated monomer in a second portion. The first and second portions are then combined to perform the polymerization step.

The polymerization step may be performed at any temperature permitting the polymerization of the organic amide monomer and the activated monomer in the presence of the organic carbonate and permitting the production of the polymerized material. Preferably, the polymerization step is performed at a relatively low temperature, between the melting point of the organic amide monomer and about 150° Celsius. However, in the preferred embodiment, the polymerization step is performed at a temperature between about 100° Celsius and about 150° Celsius, and more preferably, between about 120° Celsius and about 150° Celsius.

The polymerization may be carried out in any suitable vessel or container. For instance, the polymerization may be carried out in situ in a mold of the desired shape and size (with or without pre-loaded filler reinforcement as discussed below). The organic amide monomer along with the anionic initiator and the organic carbonate activator may be injected into the mold at a temperature lower than that required for polymerization and subsequently the temperature of the mold raised. The low viscosity of the monomer facilitates the process of injection.

In the preferred embodiment of the process, it is believed that the following polymerization reactions occur using polycarbonate and carbonate cyclic oligomer respectively:

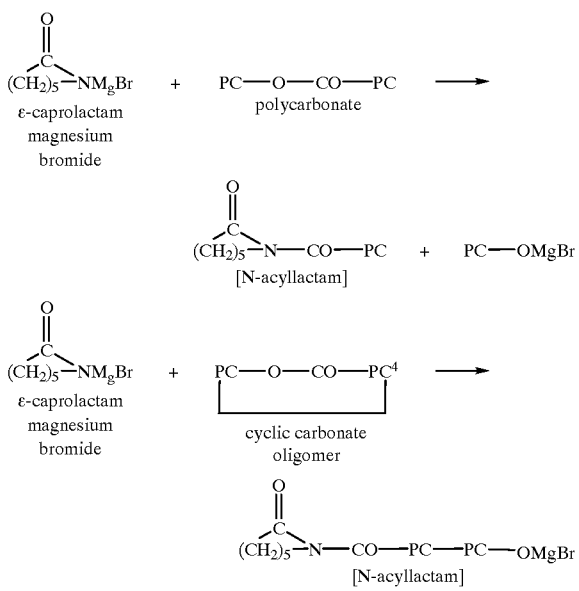

It is believed that the propagation of the Nylon 6™ chain that starts with the N-acyllactam in either of the above equations will produce a di-block copolymer (A-B) of Nylon 6™ and polycarbonate.

Further, it should be noted that the polycarbonate chain at the end of the N-acyllactam formed in the equation for polycarbonate may be capable of initiating yet another chain of Nylon 6™ due to the presence of a large number of the —O—CO— groups in its backbone. Such an initiation would likely produce either a tri-block (A-B-A) copolymer, or another di-block copolymer of Nylon 6™ and polycarbonate, depending on which fragment of the polycarbonate chain attaches to the ε-caprolactam molecule. Thus, it is conceivable that a mixture of both di- and tri-block copolymers may be produced as a consequence of the polymerization step in the preferred embodiment.

However, as discussed previously, it is difficult to say whether or not the bulk material obtained is a pure block copolymer with absolutely no homopolymer contamination. Since the polymerization of Nylon 6™ is activated solely by the N-acyllactams bearing a carbonate chain, theoretically all the Nylon 6™ present in the mixture should be blocked to a polycarbonate chain. However, the same does not hold true for the polycarbonate chains in the original mixture. In fact, the dissolution of polycarbonate (or the cyclic oligomer) in ε-caprolactam tends to be a reasonably slow process. Thus, the carbonate may not dissolve completely in the process, particularly with relatively high carbonate contents (e.g. 2.5% & 5%). Accordingly, there is doubt as to whether all the polycarbonate present in the system is blocked to Nylon 6™ chains.

The carbonate chains or cyclics, which are not blocked to the Nylon 6™ chains, would likely retain their identity throughout the course of the polymerization reaction and remain in this form even in the final material. It is thus believed that the polymerized material may be a blend of block copolymers of the organic amide monomer and the organic carbonate, homopolymers of the organic carbonate and perhaps an amount of either or both of organic amide monomer and organic amide polymer. However, even though the organic carbonate may not be completely blocked to Nylon 6™, the resulting material is believed to be a "compatibilized" blend and to be highly desirable from the point of view of possessing good mechanical properties.

Finally, the polymerization step may be performed in the presence of the filler, as described above, so that the filler is incorporated into the polymerized material to form the composite material. As previously described, the filler is comprised of glass fibers in the preferred embodiment. Any suitable process for incorporating the filler into the polymerized material to produce the composite material may be used. However, preferably, the filler is incorporated into the polymerized material in the above described process in either the first mixing step or in the polymerizing step, since addition of the filler, and in particular glass fiber, to the second mixing step may result in the sticking or adhesion of the glass fiber to the organic carbonate.

EXAMPLE

The following examples serve to more fully describe the invention.

The example was conducted according to the preferred embodiment of the process as described above except where otherwise indicated. For instance, the first mixing step and the second mixing step were performed using the same portion of the amount of heated organic amide monomer, wherein the first mixing step was performed prior to the second mixing step. As stated, in the preferred embodiment, the first mixing step and the second mixing step are performed using two separate portions of the amount of the heated organic amide monomer, which portions are subsequently combined for the performance of the polymerization step. It is anticipated for the reasons discussed above that the data and findings resulting from the performance of this preferred process will be comparable or superior to the data and findings set out below for the process as performed in the example.

In the example, 90 g. of dry ε-caprolactam was taken in a three-holed round bottomed flask and heated to 100° C., using an oil bath, and maintained at that temperature. In particular, the flask containing the dry ε-caprolactam was placed within a beaker containing oil. The beaker was then placed upon a hot plate in order to heat the oil and thereby heat the dry ε-caprolactam in the flask. On complete melting of the monomer, the isobutyl magnesium bromide initiator (2 mol % based on the weight of ε-caprolactam used) was added to the ε-caprolactam under high-speed stirring achieved by means of a magnetic stirrer. Subsequently, dry nitrogen gas was bubbled through the melt in order to remove dissolved oxygen and water vapor. After about 15 minutes of bubbling, 10 g. of polycarbonate (in the form of a powder) was added to the liquid, again, under high-speed stirring achieved by means of a magnetic stirrer. While doing so, a nitrogen blanket was maintained over the melt in the vessel. Upon substantial dissolution of the amount of polycarbonate in the ε-caprolactam melt, the temperature was raised to either 120° C. or 150° C. High-speed stirring action was maintained throughout the process.

It was found that the viscosity of the melt rose almost instantaneously after the addition of the polycarbonate to the mixture of ε-caprolactam and the activated monomer, ε-caprolactam magnesium bromide, indicating that polymerization occurred. However, the mixture remained in the liquid state (a high-viscosity liquid) for a long time. This may suggest that a low molecular weight material was produced.

Subsequently, the polycarbonate content was lowered from 10% (wt.) to 5% (wt.), without changing any of the other reaction conditions. The 5% solution behaved in a more or less similar manner when the anionic initiator content was maintained at the same level as before, i.e. the viscosity again increased as soon as polycarbonate was added to the monomer mixture but the product remained in the liquid state for several hours. However, when 4 mol % of the anionic initiator (twice the original amount) was used, a hard polymer was formed in the flask. The solid obtained was slightly discolored and fairly brittle. Further reduction of the polycarbonate content to 2.5% yielded, apparently, a much superior product than any of the above cases. Even a concentration of polycarbonate as low as 1% was found to induce Nylon 6™ polymerization to produce a superior material. In fact, it was later discovered that the material prepared with the lowest polycarbonate content displayed the best mechanical properties. The best cases were in the range of 1–2.5% by weight of the polycarbonate.

Polymerized material containing 1%, 2.5% and 5% (wt.) polycarbonate were synthesized by following the above procedure. However, since the polymer containing 5% polycarbonate did not appear to be very promising (showing discoloration and brittleness), composite materials were subsequently prepared containing only 1% and 2.5% by weight of the polycarbonate. For making the composite material, the same steps were followed except that 25% (wt.), i.e. approximately 11% (vol.), of short glass fibers were added to the ε-caprolactam monomer melt before adding any of the other ingredients.

A similar example was conducted using the cyclic carbonate oligomer as the organic carbonate. Results substantially identical to the example using polycarbonate were obtained.

Since the polymerization reactions were almost instantaneous, it is believed that N-acyllactams may have been formed in situ by the reaction of the carbonates (cyclic or linear) with ε-caprolactam. However, since the reaction between ε-caprolactam and the carbonates is an extremely slow reaction, it is more likely that the carbonates reacted with ε-caprolactam magnesium bromide (the "activated monomer") rather than the pure ε-caprolactam. The consequent irreversible consumption of the initiator isobutyl magnesium bromide may explain why higher initiator concentrations, as compared to the pure Nylon 6™ case, were required for the syntheses. It should be noted that the polymerization reaction occurred quickly even in the absence of an activator such as phenyl isocyanate, thus suggesting that the carbonates may perform an activator function in the polymerization process.

Differential scanning calorimetric curves (heating and cooling scans, between 0 and 250° C.) were obtained for the various materials, i.e. for materials made with the two different types of carbonate and polymerized at 120° C. Corresponding scans were obtained for pure Nylon 6™, pure polycarbonate, and the carbonate cyclic oligomer in order to provide a basis for comparison. It can be inferred from these scans that even though a very small amount of carbonate is present in every polymerized material, the polymer structure is different from that of pure Nylon 6™.

In addition, all of the polymerized materials and the composite materials were tested for their tensile properties. The specimens cut from the materials were approximately 4 mm. thick and 9.5 mm. wide. Testing was done on a MTS tensile tester. A single tensile stress($\sigma$)-strain($\gamma$) test $\sigma(\gamma)$ carried to failure gave four properties of the material namely the elastic modulus (E), the tensile strength ($\sigma_b$), the strain at break ($\gamma_b$), and the toughness ($\tau$).

Mechanical properties of Nylon 6™ have been found to be very sensitive to the moisture content of the atmosphere. This is due to the high affinity of Nylon 6™ toward water. Therefore, all the sample specimens that were tested were pre-conditioned in order to achieve equilibrium with an environment of the same relative humidity, 50% (common standard condition), at 22° C. Before doing so, the samples were dried in an oven at 110° C. for about 3 hours to eliminate, or at least minimize, their moisture content. The pre-conditioning was done by keeping the samples for 24 hours in a desiccator, which was maintained at the desired relative humidity by placing in it a petridish containing a glycerol/water mixture (7:1 by volume). The relative humidity, as measured by a humidity gauge, remained almost constant over the period required for the mechanical tests. All tests were performed at room temperature (about 22° C.).

Four tensile specimens of each material were fabricated for testing. These specimens were sliced from the materials as they were made in the reaction flask and subsequently machined to give smooth surfaces and uniform dimensions.

Tensile properties calculated from the stress-strain curves for all samples of the materials (polymerized materials and composites) are summarized in Tables 5 through 8. Tables 5 and 7 show the properties of the polymerized materials, and Tables 6 and 8 display those of their corresponding composites. The left-hand column of all the tables represents materials which were synthesized at 120° C. and the right-hand column shows those that were made at 150° C.

TABLE 5

Tensile properties of polymerized materials
(synthesized using commercial polycarbonate)
E: Elastic modulus, $\sigma_b$: Tensile strength, $\gamma_b$: Strain at break, $\tau$: Toughness

| t = 120° C. | | t = 150° C. | |
|---|---|---|---|
| PC = 0.0% (Nylon 6 ™) | E = 3.967 GPa $\sigma_b$ = 85.44 MPa $\gamma_b$ = 2.48% $\tau$ = 1.063 MPa | PC = 0.0% (Nylon 6 ™) | E = 3.785 GPa $\sigma_b$ = 86.20 MPa $\gamma_b$ = 2.60% $\tau$ = 1.091 MPa |
| PC = 1.0% (Nylon 6 ™) | E = 3.877 GPa $\sigma_b$ = 119.52 MPa $\gamma_b$ = 5.30% $\tau$ = 4.370 MPa | PC = 1.0% (Nylon 6 ™) | E = 3.861 GPa $\sigma_b$ = 101.75 MPa $\gamma_b$ = 3.35% $\tau$ = 2.138 MPa |
| PC = 2.5% (Nylon 6 ™) | E = 4.230 GPa $\sigma_b$ = 80.46 MPa $\gamma_b$ = 2.10% $\tau$ = 1.014 MPa | PC = 2.5% (Nylon 6 ™) | E = 3.645 GPa $\sigma_b$ = 57.53 MPa $\gamma_b$ = 1.93% $\tau$ = 0.650 MPa |
| PC = 5.0% (Nylon 6 ™) | E = 4.165 GPa $\sigma_b$ = 35.70 MPa $\gamma_b$ 1.0% $\tau$ = 0.186 MPa | PC = 5.0% (Nylon 6 ™) | E = 3.64 GPa $\sigma_b$ = 42.56 MPa $\gamma_b$ = 1.2% $\tau$ = 0.563 MPa |

TABLE 6

Tensile properties of composites
(synthesized using commercial polycarbonate)
E: Elastic modulus, $\sigma_b$: Tensile strength, $\gamma_b$: Strain at break, $\tau$: Toughness

| t = 120° C. | | t = 150° C. | |
|---|---|---|---|
| PC = 0.0% (Nylon 6 ™) | E = 5.96 GPa $\sigma_b$ = 59.46 MPa $\gamma_b$ = 1.25% $\tau$ = 0.361 MPa | PC = 0.0% (Nylon 6 ™) | E = 6.11 GPa $\sigma_b$ = 60.34 MPa $\gamma_b$ =1.13% $\tau$ = 0.357 MPa |
| PC = 1.0% (Nylon 6 ™) | E = 5.89 GPa $\sigma_b$ = 106.85 MPa $\gamma_b$ = 2.67% $\tau$ = 1.459 MPa | PC = 1.0% (Nylon 6 ™) | E = 5.98 GPa $\sigma_b$ = 96.20 MPa $\gamma_b$ = 2.18% $\tau$ = 1.218 MPa |
| PC = 2.5% (Nylon 6 ™) | E = 5.68 GPa $\sigma_b$ = 70.75 MPa $\gamma_b$ = 1.48% $\tau$ = 0.527 MPa | PC = 2.5% (Nylon 6 ™) | E = 6.08 GPa $\sigma_b$ = 69.27 MPa $\gamma_b$ = 1.55% $\tau$ = 0.617 MPa |

TABLE 7

Tensile properties of polymerized materials
(synthesized using the cyclic carbonate oligomer)
E: Elastic modulus, $\sigma_b$: Tensile strength, $\gamma_b$: Strain at break, $\tau$: Toughness

| t = 150° C. | | | |
|---|---|---|---|
| CCO = 0.0% (Nylon 6 ™) | E = 3.967 GPa $\sigma_b$ = 85.44 MPa $\gamma_b$ = 2.48% $\tau$ = 1.063 MPa | CCO = 0.0% (Nylon 6 ™) | E = 3.785 GPa $\sigma_b$ = 86.20 MPa $\gamma_b$ = 2.60% $\tau$ = 1.091 MPa |
| CCO = 1.0% (Nylon 6 ™) | E = 4.290 GPa $\sigma_b$ = 113.35 MPa $\gamma_b$ = 4.38% $\tau$ = 2.800 MPa | CCO = 1.0% (Nylon 6 ™) | E = 4.028 GPa $\sigma_b$ = 107.65 MPa $\gamma_b$ = 3.73% $\tau$ = 2.407 MPa |
| CCO = 2.5% (Nylon 6 ™) | E = 4.165 GPa $\sigma_b$ = 74.73 MPa $\gamma_b$ = 2.08% $\tau$ = 0.805 MPa | CCO = 2.5% (Nylon 6 ™) | E = 3.896 GPa $\sigma_b$ = 59.00 MPa $\gamma_b$ = 1.48% $\tau$ = 0.428 MPa |
| CCO = 5.0% (Nylon 6 ™) | E = 3.366 GPa $\sigma_b$ = 21.03 MPa $\gamma_b$ = 0.6% $\tau$ = 0.133 MPa | CCO = 5.0% (Nylon 6 ™) | E = 3.630 GPa $\sigma_b$ = 38.18 MPa $\gamma_b$ = 1.55% $\tau$ = 0.210 MPa |

TABLE 8

Tensile properties of composites
(synthesized using the cyclic carbonate oligomer)
E: Elastic modulus, $\sigma_b$: Tensile strength, $\gamma_b$: Strain at break, $\tau$: Toughness

| t = 120° C. | | t = 150° C. | |
|---|---|---|---|
| CCO = 0.0% (Nylon 6 ™) | E = 5.96 GPa $\sigma_b$ = 59.46 MPa $\gamma_b$ = 1.25% $\tau$ = 0.361 MPa | CCO = 0.0% (Nylon 6 ™) | E = 6.11 GPa $\sigma_b$ = 60.34 MPa $\gamma_b$ = 1.13% $\tau$ = 0.357 MPa |
| CCO = 1.0% (Nylon 6 ™) | E = 5.88 GPa $\sigma_b$ = 112.74 MPa $\gamma_b$ = 3.08% $\tau$ = 1.808 MPa | CCO = 1.0% (Nylon 6 ™) | E = 5.93 GPa $\sigma_b$ = 111.98 MPa $\gamma_b$ = 2.75% $\tau$ = 1.296 MPa |
| CCO = 2.5% (Nylon 6 ™) | E = 5.73 GPa $\sigma_b$ = 85.62 MPa $\gamma_b$ = 1.90% $\tau$ = 0.781 MPa | CCO = 2.5% (Nylon 6 ™) | E = 6.65 GPa $\sigma_b$ = 66.24 MPa $\gamma_b$ = 1.33% $\tau$ = 0.425 MPa |

Tensile properties of the polycarbonate (compression molded at 250° C.) obtained from Scientific Polymer Products (SP2), which was used in the examples, are shown in Table 9.

TABLE 9

Tensile properties of the compression molded polycarbonate
(obtained from Scientific Polymer Products)

| Elastic modulus (E) | 2.60 GPa |
|---|---|
| Tensile Strength ($\sigma_b$) | 74.97 MPa |
| Strain at Break ($\gamma_b$) | 8.5%* |
| Toughness ($\tau$) | MPa |

*Note that yielding occurred here too as in pure Nylon 6 ™ that was compression molded.

Plots of tensile strength versus carbonate content, for the two different polymerization temperatures and for the two different types of carbonates used (high-molecular weight linear and relatively low-molecular weight cyclic), reveal that the tensile strength of the polymerized materials is improved by almost 50% by the presence of a mere 1% carbonate. Also the polymerization temperature is seen to affect the tensile strength of the materials significantly when carbonates are present in them. For example, lower-temperature synthesis yields products with better tensile strength than does higher-temperature synthesis. The values of tensile strength, from Tables 5 and 7, also show that these $\sigma_b$ values for the materials with 1% carbonate content are considerably higher than those of both the pure homopolymers.

Furthermore, the tensile strength of the materials using both types of carbonates drops with the increasing carbonate content of the mixture once an optimum carbonate content is reached. For instance, the tensile strength of 1% carbonate is higher than the tensile strength of Nylon 6™. However, the tensile strength of the polymerized material decreases as the carbonate content increases from a carbonate content of 1% to 2.5%, and similarly as the carbonate content increases from 2.5% to 5%. The overall effect of temperature on tensile strength, however, remains the same, except for the materials with 5% carbonate which apparently perform better when synthesized at a higher temperature. Further, the materials containing 5% carbonate were found to be discolored and brittle even before testing.

The materials containing 2.5% carbonate and synthesized at 120° C. showed tensile strengths comparable to that of Nylon 6™ (although slightly lower). However, there was no discoloration or brittleness observed for these samples. Moreover, these samples were potentially significant in making composites due to their relatively high carbonate content from the point of view of achieving good adhesion to glass fibers. Their adhesion property was apparent during their synthesis in glass flasks wherein the product adhered well to the flask on breaking the flask.

No significant difference in the trend of tensile strength in the materials with carbonate content was apparent for the two different types of carbonates used except that the curves for the two different temperatures are slightly more separated in the polycarbonate case than in the case of the cyclic carbonate oligomer. Also the tensile strength values in any one of these plots is comparable to the corresponding values in the other.

As stated, it was found that the greatest improvement in the tensile strength over that of pure Nylon 6™ was achieved by incorporating just 1% carbonate in the raw-material mixture. Further, the tensile strength of the 1% carbonate polymerized material was greater than the tensile strengths of both pure Nylon 6™ and pure polycarbonates, as shown in Tables 5, 7 and 9. This improvement may result from a three-dimensional network, similar to that observed in tri-block copolymers, being somehow approximated by this material.

Solubility experiments were conducted using formic acid, which is known to be a good solvent for pure Nylon 6™. All the materials other than pure Nylon 6™ showed significant swelling effects in formic acid and formed a transparent gel. On the other hand, pure Nylon 6™ dissolved completely in formic acid to give an optically clear solution. This is believed to indicate that, in all the materials containing carbonate, a network structure may have been achieved, which held the sample together in opposition to the thermodynamic forces trying to dissolve its major component (Nylon 6™). The nylon in these materials is believed to have failed to dissolve in formic acid because all the nylon blocks were chemically linked to the carbonate blocks which, in turn, were held together by the microdomains of the carbonate phase. These microdomains of the carbonate phase, apart from holding the nylon phase together, may themselves be interconnected in some way, giving the polymer a structure similar to that of a cross-linked rubber.

Whether the materials may be chemically cross-linked (rubber-like) or just physically cross-linked (elastomeric) is not precisely known. However, from the polymerization chemistry, it can be inferred that the materials are more likely to have a physically cross-linked structure rather than a rubber-like (permanently cross-linked) network.

Due to the very low concentration of carbonate, the microdomains in the materials are expected to be extremely small in size and quite dilute. Thus, a tension in the material would tend to lead to an effective transfer of load to those connecting carbonate domains from the surrounding nylon matrix.

The significantly higher tensile strength of the material containing 1% carbonate and synthesized at 120° C., as compared to Nylon 6™, suggests the presence of a strong interconnecting network structure in the materials. The tensile strength drops when the carbonate content in the materials increases and also if the polymerization temperature is higher.

These observations may be understood by considering the melt polymerization of the carbonate/ε-caprolactam mixture and how solubility may play a role. The amount of dissolved carbonate in ε-caprolactam has been found to increase with both temperature and total carbonate content. In that case, there is a higher probability of getting di-block instead of tri-block or multi-block copolymers, likely resulting in a larger fraction of di-blocks in the system. Di-block copolymers reduce the overall networking efficiency of the materials since they are believed to be incapable of connecting domains. This, in turn, may lead to a reduction in the strength of the nylon phase. Second, the carbonate domain size tends to be larger than before and can contain flaws that could lead to the fracturing of the materials. Finally, the molecular weight of the Nylon 6™ obtained tends to decrease with an increase in the dissolved carbonate content. Thus the strength of the nylon matrix phase itself is believed to be lower when the concentration of dissolved carbonate is higher. All these factors coupled together may explain why the tensile strength of the materials goes down when either the carbonate concentration or the polymerization temperature goes up.

Unlike tensile strength, the elastic modulus does not depend on the flaws in the materials and thus is a true material property which is not affected by low percentages of carbonate in the mixture. Instead, the elastic modulus is determined solely by the stresses developed in the amorphous phase arising from the ε-caprolactam at low strain values. Since the fraction of the phase arising from the ε-caprolactam is not expected to vary significantly with either the carbonate content or polymerization temperature, no trend in elastic modulus with these two parameters was observed. In other words, all the polymerized materials display approximately the same elastic modulus which is characteristic of the predominant phase which arises from the ε-caprolactam.

The strain at break shows a variation with temperature and carbonate content similar to that of the tensile strength. The explanation, like that for tensile strength, may lie in the fact that the three-dimensional network may be stronger in the materials containing 1% carbonate and synthesized at 120° C. than in other materials which contain higher amounts of dissolved carbonate in the polymerizing melt. The 1%, low-temperature polymer can be strained up to a value closer to its true elastic limit before fracture than the other materials, which fail before this limit is reached due to a relatively weaker structure (chain disentanglement type failure).

Toughness, which is given by the area under the stress-strain curve, is the highest for the material which has the highest tensile strength and strain at break, i.e. 1% carbonate, 120° C. Toughness in a material also depends strongly on whether the material yields before breaking or undergoes a catastrophic failure. However, since the materials tend to mostly exhibit the latter type of fracture, thereby showing an approximately linear stress-strain behavior, the toughness is solely a function of the stress and strain at break.

A comparison of Tables 6 and 8 with Tables 5 and 7 respectively shows that, as for the polymerized materials, the tensile strength values for the composite materials containing 1% polycarbonate or cyclic oligomer are the highest. However, unlike the polymerized materials, the values of tensile strength of the composites with 2.5% carbonate are better than those for pure Nylon 6™. Effects of polymerization temperatures on the tensile strength are similar to those observed for the materials alone.

A factor of great importance for composites design is the improvement in the tensile strength which may be achieved by incorporating glass fibers in the polymerized material. This factor, termed here as "reinforcement", has been defined here as 100 times the ratio of the tensile strength of a composite to the tensile strength of its matrix material. Thus, a value of reinforcement above 100 indicates that the tensile strength of the composite material is better than that of the corresponding polymerized material, and a value below 100 means that a reduction of tensile strength resulted from the incorporation of glass fibers. A value of 100 or close to 100 implies that there is no significant change in the tensile strength.

Referring to Tables 6 and 8, the tensile strength of Nylon 6™ dropped to approximately 75% of its original value when glass fibers were present in the matrix at a volume fraction of approximately 11%. However, the carbonate-containing composite materials displayed either approximately the same tensile strength (e.g. for 1% carbonate, reinforcement was either just below or just above 100) or an improved tensile strength (e.g. for 2.5% carbonate, reinforcement was mostly above 100).

Unlike the tensile strength, the elastic modulus was improved significantly by the incorporation of glass fibers in the matrix in all the composite materials (including Nylon 6™). Moreover, no trend, such as that seen in the tensile strength, with polymerization temperature or carbonate content is evident in the composites for both the improvement in elastic modulus and the modulus itself.

The observed tensile strength behavior of the three composites, viz. those of Nylon 6™, 1% carbonate and 2.5% carbonate, is believed to arise from the differences in their fracture mechanisms which, in turn, may be predicted from the trends in tensile strength and strain at break and from scanning electron micrographs (SEM) of their fracture surfaces. The SEM of the fracture surface of the Nylon 6™/glass-fiber composite material reveals lack of adhesion (fiber pull-out) between the Nylon 6™ and glass fibers, whereas those of the surfaces of the composites containing polycarbonate or cyclic oligomer show the material matrix adhering well to the glass fibers even after failure of the composite materials.

Fracture in composites can take place in one of three different ways: failure of the glass fibers, failure of the matrix material, and delamination of the fiber/matrix interface. The first two are solely dependent on the properties of the individual materials and thus cannot be manipulated in any way other than by trying different materials. However, the stress required to delaminate the interface in a particular composite depends on how strongly the matrix is bonded (either mechanically or chemically) to the fibers.

Composites with a matrix containing 1% carbonate show good adhesion between the matrix and glass in the SEM fractographs and does not support failure due to delamination. Moreover, the strain at break of the matrix, as shown in Table 6 is higher than that of glass. Therefore, the fracture in these materials is likely caused by the breaking of glass fibers.

The strength of this composite material may be improved by a higher volume fraction of glass fibers being used for reinforcement. The stress-strain curve would then be represented by a curve wherein the fracture of the composite material occurs at the same strain as for glass, but at a much higher stress. Also, the alignment of glass fibers in the direction of the load would tend to render an upward shift in the stress-strain curve of the composite material thereby increasing its tensile strength. However, it is necessary that the interface-delamination stress is not reached, before the glass fractures, in order to achieve this behavior.

Composites with a matrix containing 2.5% carbonate have a strain at break lower than that of glass (see Tables 6 and 8). In fact, the matrix itself has a lower strain at break than glass. Therefore this composite material is believed to undergo fracture by means of matrix failure. It can be seen that this composite has a higher tensile strength than the pure matrix material. As in the 1% carbonate case, further improvement in the tensile strength may be possible by increasing the glass-fiber content or orienting the fibers in the direction of load. Thus at the ultimate strain $\gamma_{2.5\%}$, the composite material will exhibit a higher stress.

The behavior of elastic modulus in the composite materials is very different than that of tensile strength. It can be seen from Tables 5 through 8 that a reinforcement is achieved by incorporating glass fibers in all of the materials. Moreover, there is no significant trend observed with either carbonate content or temperature of polymerization. Modulii of all the composites are practically the same.

In calculating the elastic modulus, only the low-strain portion of the stress-strain curve is significant. At such low strains, and correspondingly low stresses, the mechanical adhesion between the matrix and fibers tends to be enough to prevent fiber/matrix delamination. In fact, even if the mechanical bonding is not strong enough, the surface area over which bonding occurs, which is the total glass-fiber surface area, is significantly large. Thus in this region of the tensile curve, the applied load is not typically enough to delaminate the surface. The load then is effectively transferred from the matrix to the glass fibers through the interface and a considerable improvement in the elastic modulus may be achieved.

Thus, in conclusion, it has been found that desirable mechanical and structural properties may be achieved by the polymerization of an organic amide monomer in the presence of an organic carbonate. Moreover, the resulting polymerized material may act as a matrix for the production of high-performance glass-fiber reinforced composites. Finally, best results appear to be achieved by minimizing the amount of organic carbonate that is incorporated into the material and by minimizing the temperature at which polymerization takes place.

The embodiments of the invention in which an exclusive property or privilege is claimed are defined as follows:

1. A process for the preparation of a polymerized material from an organic amide monomer and an organic carbonate, The process comprising the following steps:
   (a) heating an amount of the organic amide monomer to a temperature above its melting point;
   (b) first mixing an amount of an anionic initiator with at least a portion of the amount of heated organic amide monomer to produce an amount of activated monomer, wherein the anionic initiator is not comprised of an alkali metal;
   (c) second mixing an amount of the organic carbonate with at least a portion of the amount of heated organic amide monomer to produce an amount of dissolved organic carbonate, wherein the amount of organic carbonate is a finite amount which is less than about 5% by weight of the amount of organic amide monomer and the amount of organic carbonate combined;
   (d) polymerizing the amount of heated organic amide monomer and the amount of activated monomer in the presence of the amount of dissolved organic carbonate to produce the polymerized material.

2. The process as claimed in claim 1 wherein the organic amide monomer is comprised of a cyclic organic amide monomer.

3. The process as claimed in claim 2 wherein the cyclic organic amide monomer is comprised of $\epsilon$-caprolactam.

4. The process as claimed in claim 3 wherein the organic carbonate is comprised of an aromatic carbonate.

5. The process as claimed in claim 4 wherein the aromatic carbonate comprises a polycarbonate, a cyclic oligomer or mixtures thereof.

6. The process as claimed in claim 5 wherein the anionic initiator is comprised of a magnesium halide.

7. The process as claimed in claim 6 wherein the anionic initiator is comprised of an organic magnesium halide.

8. The process as claimed in claim 7 wherein the organic magnesium halide is comprised of isobutyl magnesium bromide.

9. The process as claimed in claim 7 wherein the polymerization step is performed at a temperature between the melting point of the organic amide monomer and about 150° Celsius.

10. The process as claimed in claim 9 wherein the polymerization step is performed at a temperature between the melting point of the organic amide monomer and about 120° Celsius.

11. The process as claimed in claim 7 wherein the polymerization step is performed at a temperature between about 100° Celsius and about 150° Celsius.

12. The process as claimed in claim 11 wherein the polymerization step is performed at a temperature between about 120° Celsius and about 150° Celsius.

13. The process as claimed in claim 11 wherein the second mixing of the organic carbonate with the heated organic amide monomer and the polymerization step are conducted in a substantially inert environment.

14. The process as claimed in claim 13 wherein the inert environment comprises a nitrogen atmosphere.

15. The process as claimed in claim 5 wherein the first mixing step and the second mixing step are performed using two separate portions of the amount of the heated organic amide monomer, which portions are subsequently combined for the performance of the polymerization step.

16. The process as claimed in claim 1 wherein the amount of organic carbonate is a finite amount which is less than about 2.5% by weight of the amount of organic amide monomer and the amount of organic carbonate combined.

17. The process as claimed in claim 16 wherein the amount of organic carbonate is a finite amount which is less than about 1% by weight of the amount of the organic amide monomer and the amount of organic carbonate combined.

18. The process as claimed in claim 5 wherein the amount of organic carbonate is between about 1% and about 5% by weight of the amount of organic amide monomer and the amount of organic carbonate combined.

19. The polymerized material produced by the process of claim 18.

20. The process as claimed in claim 18 wherein the polymerization step is performed in the presence of a filler comprising a silicate so that the filler is incorporated into the polymerized material to form a composite material.

21. The process as claimed in claim 20 wherein the filler is comprised of glass fibers.

22. A polymerized material produced by the polymerization of an amount of an organic amide monomer in the presence of an amount of an organic carbonate and an amount of an anionic initiator, wherein the anionic initiator is not comprised of an alkali metal and wherein the amount of the organic carbonate is a finite amount which is less than about 5% by weight of the amount of organic amide monomer and the amount of organic carbonate combined.

23. The polymerized material as claimed in claim 22 wherein the organic amide monomer is comprised of a cyclic organic amide monomer.

24. The polymerized material as claimed in claim 23 wherein the cyclic organic amide monomer is comprised of ε-caprolactam.

25. The polymerized material as claimed in claim 24 wherein the organic carbonate is comprised of an aromatic carbonate.

26. The polymerized material as claimed in claim 25 wherein the aromatic carbonate comprises a polycarbonate, a cyclic oligomer or mixtures thereof.

27. The polymerized material as claimed in claim 22 wherein the amount of organic carbonate is a finite amount which is less than about 2.5% by weight of the amount of organic amide monomer and the amount of organic carbonate combined.

28. The polymerized material as claimed in claim 27 wherein the amount of organic carbonate is a finite amount which is less than about 1% by weight of the amount of the organic amide monomer and the amount of organic carbonate combined.

29. The polymerized material as claimed in claim 26 wherein the amount of organic carbonate is between about 1% and about 5% by weight of the amount of organic amide monomer and the amount of organic carbonate combined.

30. The polymerized material as claimed in claim 29 further comprising a filler comprising a silicate, thereby resulting in a composite material.

31. The polymerized material as claimed in claim 30 wherein the filler is comprised of glass fibers.

32. The polymerized material as claimed in claim 29 wherein the polymerized material comprises a copolymer of the organic amide monomer and the organic carbonate.

33. The polymerized material as claimed in claim 32, further comprising a blend of the copolymer and the organic carbonate.

34. The polymerized material as claimed in claim 32 wherein the copolymer is comprised of a block copolymer.

35. The composite material produced by the process of claim 20.

* * * * *

UNITED STATES PATENT AND TRADEMARK OFFICE
CERTIFICATE OF CORRECTION

PATENT NO.   : 6,291,598 B1
DATED        : September 18, 2001
INVENTOR(S)  : Michael C. Williams, Nai-Hong Li, and Yatin Sankholkar It is certified that error appears in the above-identified patent and that said Letters Patent is hereby corrected as shown below:

Column 1,
Line 44, change "Theological" to -- rheological --.

Column 2,
Line 38, change "*Polumer*" to -- *Polymer* --.
Line 67, change "*Astracts*" to -- *Abstracts* --.

Column 4,
Line 39, change "site" to -- situ --.

Column 8,
Line 60, change "$H_2SO_2$" to -- $H_2SO_4$ --.

Column 9,
Line 7, change "sitzi" to -- situ --.

Column 10,
Line 41 change "carbonation" to -- carbanion --.

Column 17,
Line 11, change "ill" to -- in --.

UNITED STATES PATENT AND TRADEMARK OFFICE
CERTIFICATE OF CORRECTION

PATENT NO. : 6,291,598 B1
DATED : September 18, 2001
INVENTOR(S) : Michael C. Williams, Nai-Hong Li, and Yatin Sankholkar It is certified that error appears in the above-identified patent and that said Letters Patent is hereby corrected as shown below:

<u>Column 22,</u>
Line 45, change "$\gamma_b= 1.0\%$" to -- $\gamma_b= 1.0\%$ --.

<u>Column 23,</u>
Line 20, change "$\gamma_b\ 1.55\%$" to -- $\gamma_b= 0.9\%$ --.

Signed and Sealed this

Eleventh Day of June, 2002

Attest:

JAMES E. ROGAN
Attesting Officer
Director of the United States Patent and Trademark Office